J. S. RIVERA.
MACHINE FOR WRITING MUSICAL CHARACTERS AND INDICATIONS.
APPLICATION FILED DEC. 6, 1916.

1,251,922.

Patented Jan. 1, 1918.
10 SHEETS—SHEET 2.

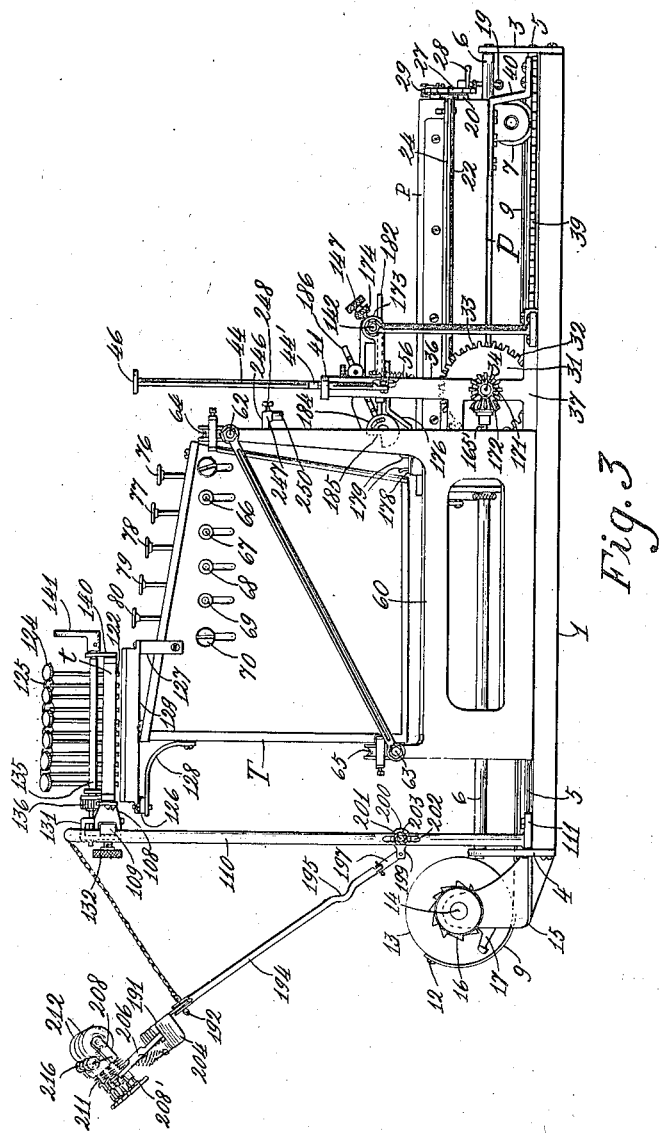

J. S. RIVERA.
MACHINE FOR WRITING MUSICAL CHARACTERS AND INDICATIONS.
APPLICATION FILED DEC. 6, 1916.
1,251,922.
Patented Jan. 1, 1918.
10 SHEETS—SHEET 4.
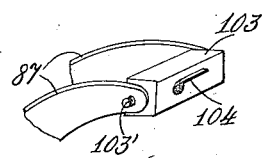
Fig. 6
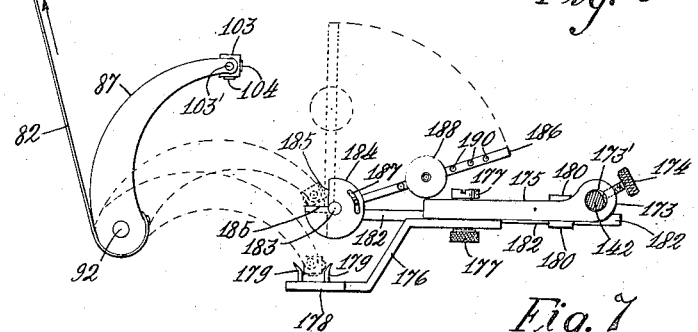
Fig. 7
Fig. 4

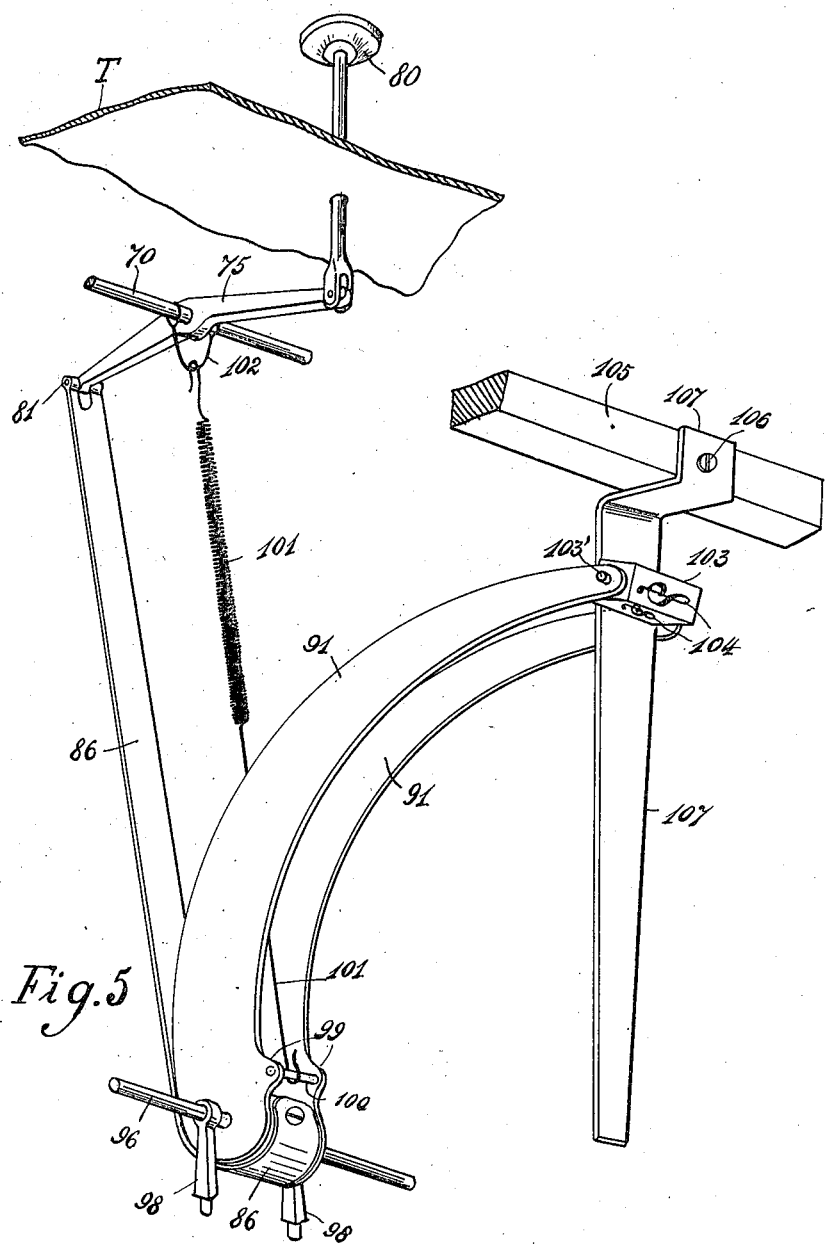

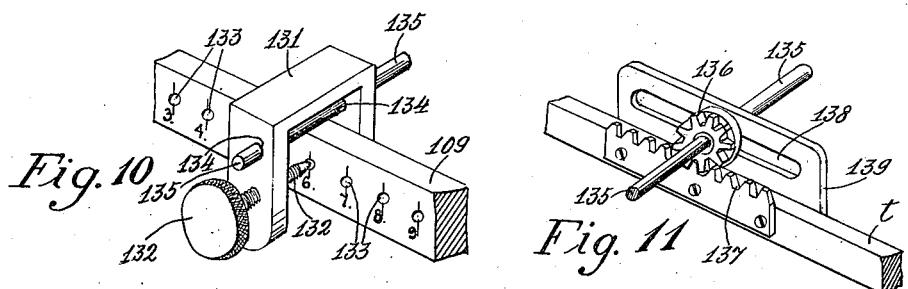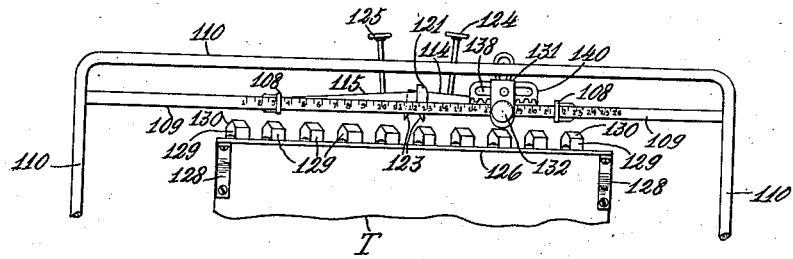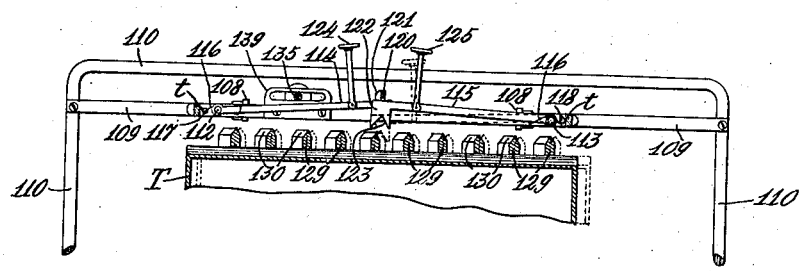

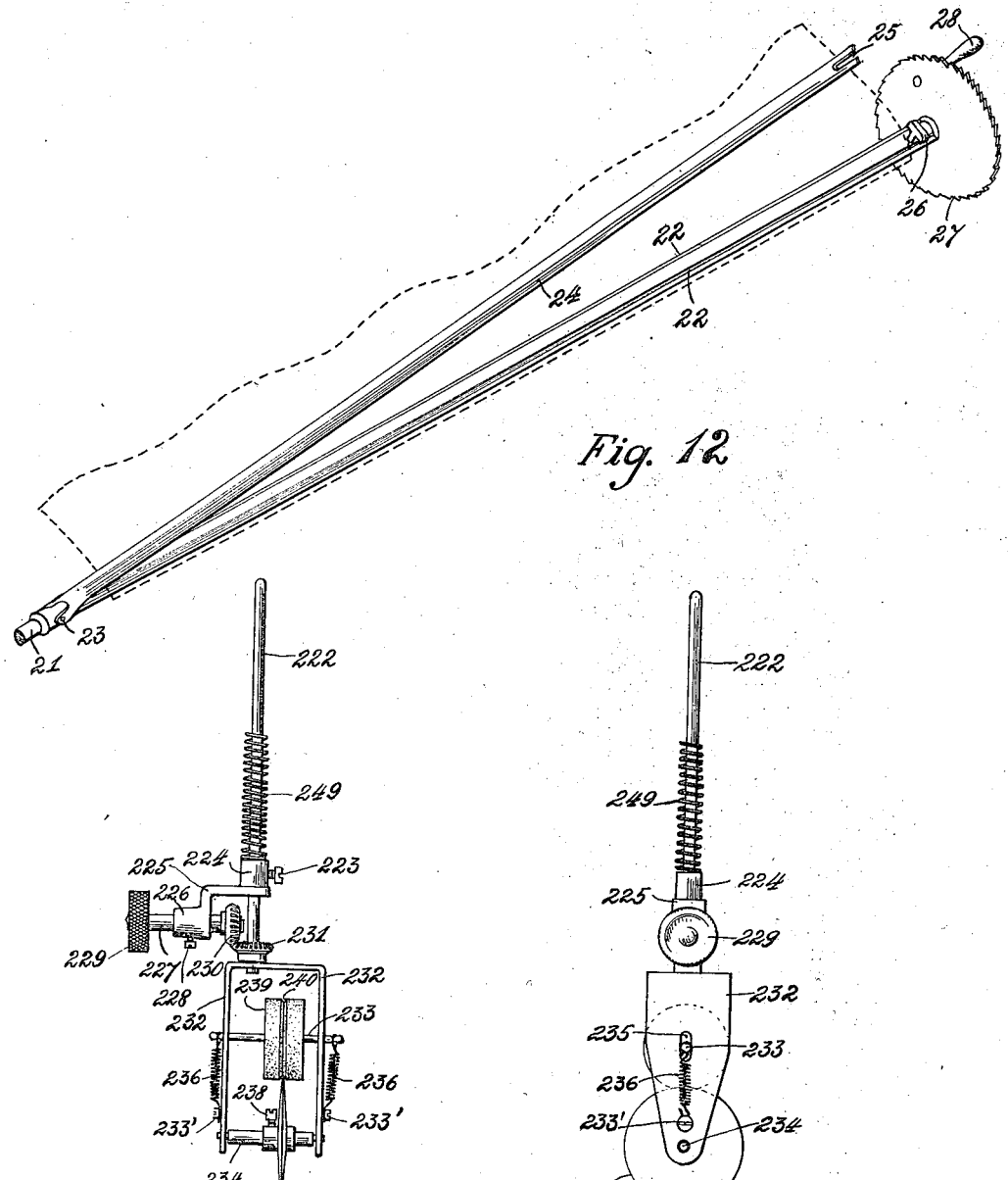

J. S. RIVERA.
MACHINE FOR WRITING MUSICAL CHARACTERS AND INDICATIONS.
APPLICATION FILED DEC. 6, 1916.

1,251,922.

Patented Jan. 1, 1918.
10 SHEETS—SHEET 8.

J. S. RIVERA.
MACHINE FOR WRITING MUSICAL CHARACTERS AND INDICATIONS.
APPLICATION FILED DEC. 6, 1916.

1,251,922.

Patented Jan. 1, 1918.
10 SHEETS—SHEET 9.

J. S. RIVERA.
MACHINE FOR WRITING MUSICAL CHARACTERS AND INDICATIONS.
APPLICATION FILED DEC. 6, 1916.
1,251,922.
Patented Jan. 1, 1918.
10 SHEETS—SHEET 10.
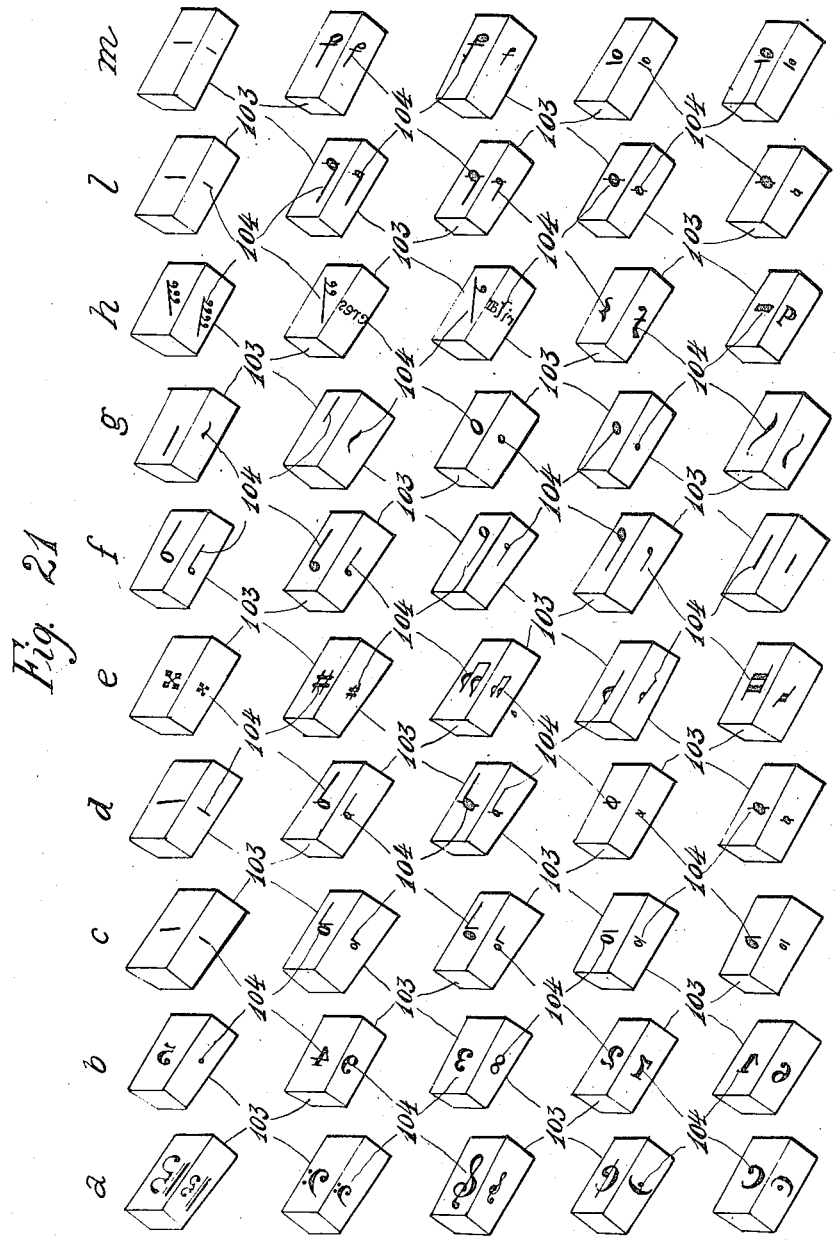

UNITED STATES PATENT OFFICE.

JOSÉ SANAHUJA RIVERA, OF HABANA, CUBA.

MACHINE FOR WRITING MUSICAL CHARACTERS AND INDICATIONS.

1,251,922.     Specification of Letters Patent.     Patented Jan. 1, 1918.

Application filed December 6, 1916. Serial No. 135,437.

*To all whom it may concern:*

Be it known that I, JOSÉ SANAHUJA RIVERA, subject of the King of Spain, residing at Habana, Cuba, have invented new and useful Improvements in Machines for Writing Musical Characters and Indications, of which the following is a specification.

The invention relates to a music typewriter by means of which musical characters are printed and the staff traced.

The object of the invention is to provide certain improvements in a machine for which Letters Patent have been obtained under No. 1,063,470, dated June 3, 1913.

Among the many objects of the invention one is to provide an improved construction of the type carriage, to arrange the keys in a new manner so as to reduce the amount of space required. It is also an object of the invention to provide a new mechanism for moving the paper carriage.

A further object aims at an improved construction of the mechanism for tracing the musical staff. A further object of the invention aims at the provision of an auxiliary keyboard to shift the type carriage so as to place the notes in different relation with respect to the musical staff, whereby the notes have different pitch values.

A further object constitutes the provision of special means for tightening and holding the paper of the carriage. It is also an object of the invention to provide an improved construction of the mechanism for tracing the flags of full, half, quarter, eighth notes, etc.

Another object embraces the provision of special means for tracing the ties. A further object aims at the provision of means for actuating the types containing characters of different sizes, so that when desired grace notes may be printed.

To the accomplishment of the object stated and others that will become apparent as the description proceeds, the invention is predicated on the means described in the following specification, specifically set forth in the appended claims, and illustrated in the accompanying drawings, in which—

Fig. 3 is a side elevation thereof;

Fig. 4 is a vertical cross-section of the machine on line 4—4, Fig. 2;

Fig. 5 is an enlarged perspective view of a key and the mechanism connecting the same with the type block;

Fig. 6 is a detail perspective view of the type block and the ends of the supporting arms;

Fig. 7 is a detail side view of the device for actuating the type block prior to reaching printing position;

Fig. 8 is a fragmentary rear view of the mechanism for shifting the key carriage relative to the printing zone, whereby the printed notes receive different pitch values, in accordance with their position relative to the staff;

Fig. 9 is a vertical section of the mechanism shown in Fig. 8;

Fig. 10 is a detail perspective view of means for adjusting the key carriage shifting means;

Fig. 11 is a further detail perspective view disclosing the means for shifting the key carriage a distance equal to the distance between the bass and high registers;

Fig. 12 is an enlarged detail view of the device employed for tensioning the paper on the paper carriage platen;

Fig. 13 is a front elevation of an auxiliary mechanism for tracing the ties of different sizes;

Fig. 14 is a side elevation of the mechanism shown in Fig. 13;

Fig. 21 is a perspective view of the entire type blocks, each of which has the same type in different sizes.

Figure 1:
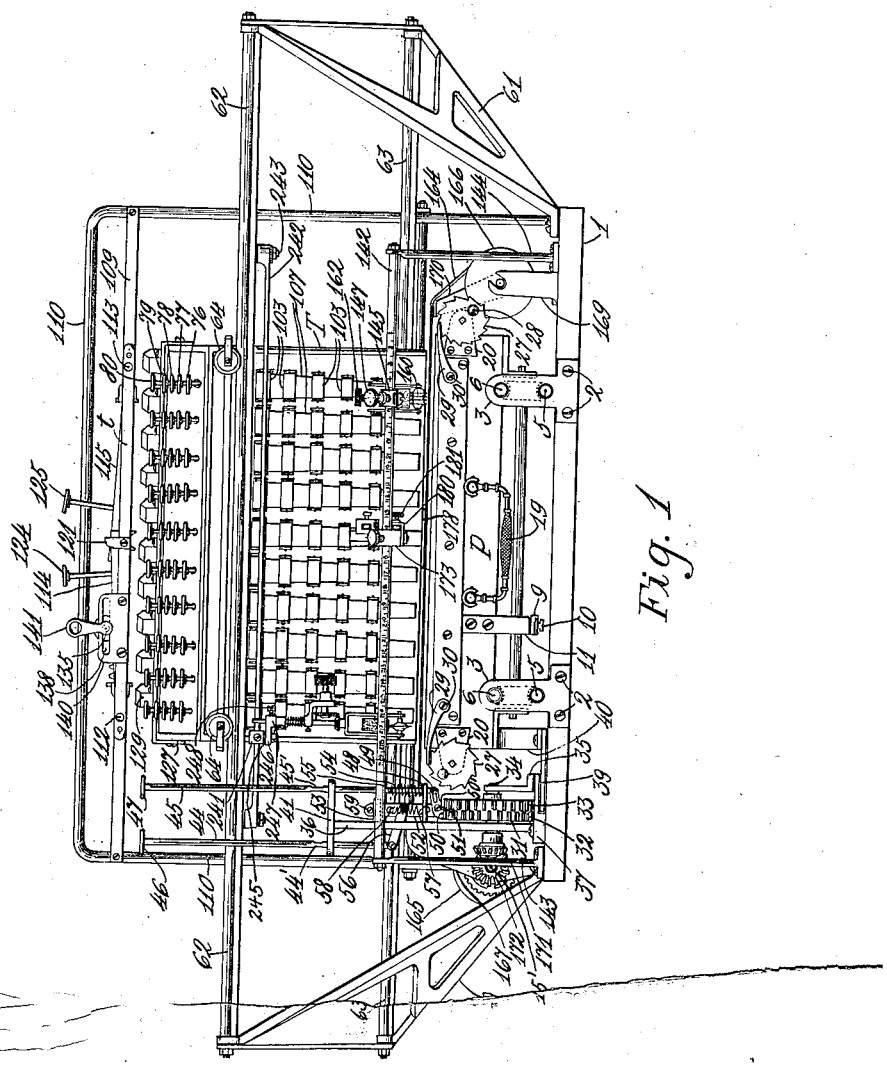
Figure 1 is a front elevation of a music typewriter provided with the improvements which form the subject matter of the invention.
Figure 2:
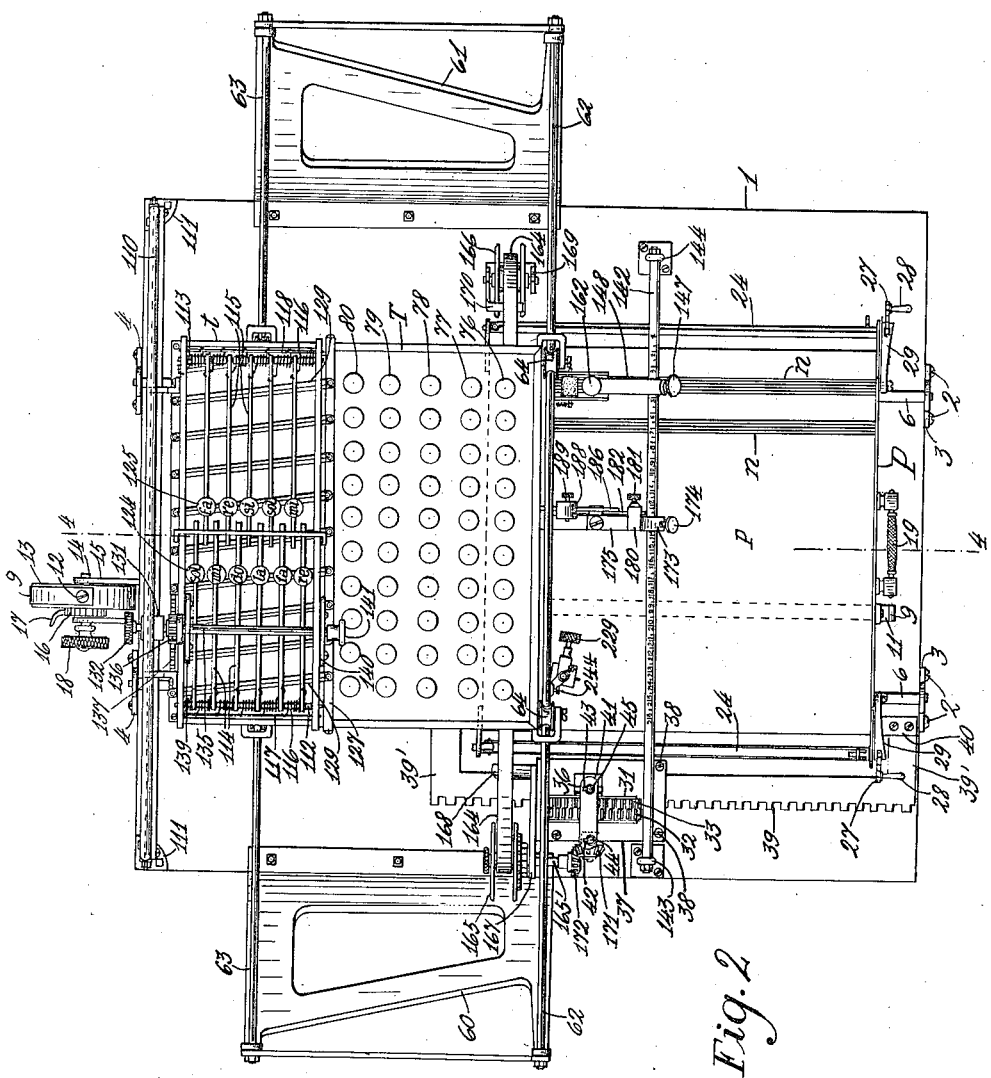
Fig. 2 is a top plan view of the machine.

Referring to the drawings, 1 designates a platform which on its front side has secured thereto in spaced relation a pair of vertical standards 3 secured to the platform by means of threaded members 2. In alinement with said standards similar standards 4 are secured to the rear side of the platform, and appertaining standards 3 and 4 form bearings for horizontal bars 5 and 6, which constitute upper and lower rails for rollers 7 and 8, rotatably secured to the sides of a carriage P, on which the writing paper is placed. The carriage is provided with a platen $p$ forming the support for the paper, and is adapted to be reciprocated by a motor in the form of a spring, as will be presently described. A leaf spring 9 extends underneath the carriage and receives in an aperture at its forward end a pin 10, projecting from the lower edge of a vertical plate 11, secured by screws to the front side of the carriage P. The rear end of the spring 9 is secured by a rivet 12 to the periphery of a drum or casing 13, containing a spirally wound spring under tension, so that a constant pull is exerted upon the spring 9, which forces the carriage, when released, rearwardly, as will be hereinafter further explained. The casing 13 is secured on a bracket 15 fastened by screws to the platform 1 and projecting rearwardly therefrom. A shaft 14, journaled in said bracket 15, carries the casing 13 and has a ratchet wheel 16 fast thereto and controlled by a pawl 17, which may be placed in engaging position to maintain the spring in the casing 13 under tension. To the shaft 14 furthermore a knurled disk 18 is keyed to facilitate manipulation of the shaft, whereby the spring contained in the casing 13 may be placed under a suitable degree of tension. To the front side of the carriage P a handle 19 is secured, whereby the carriage may be conveniently pulled forwardly after reaching its rear terminal position.

To hold the paper on the platen $p$ in proper position to receive the imprint of the musical characters (notes, signs, and the like), a mechanism is provided to keep the paper under slight tension. This mechanism includes bracket plates 20 extending beyond the width of the carriage and fastened thereto at the front and rear sides respectively. The plates 20 are provided with apertures to receive a rock shaft 21, covered throughout its length by a stationary semi-cylindrical trough 22 (Fig. 12), to the end portions of which another semi-cylindrical trough or casing 24 is hinged, as at 23, which second casing is coextensive with the casing 22, and is slotted at its free end, as at 25. This slot is adapted to receive a key 26 when the casing 24 is placed over the shaft 21. The key 26 is rotatably secured on the shaft 21, and when placed to extend vertically to the direction of the slot 25, the casing 24 is locked to the shaft 21. The writing paper is inserted between the casing 24 and the shaft 21, and subsequently the casing 24 is locked in engaging position with respect to the shaft 21, whereby the paper inserted therein is held tight on the platen $p$ of the carriage P, to be adapted to receive the imprints. The tensioning of the paper is effected by rotation of the ratchet wheel 27, provided on the forward end of the rock shaft 21 and equipped with a handle 28. A detent 29, pivoted, as at 30, on the front side of the carriage P, prevents back rotation of the ratchet wheel and incidentally disengagement of the paper. The shifting of the carriage P a distance equal to the distance of two consecutive notes on the musical staff is effected by a mechanism arranged at the left side of the carriage and which at the same time moves an ink ribbon against which the type strikes to make an impression on the paper. This mechanism includes a gear 31, provided on its periphery with two series of teeth, respectively designated by 32 and 33 and arranged in such manner that the teeth of one series are offset with respect to the teeth of the second series.

The gear 31 is keyed to a horizontal shaft 34, journaled in standards 35 and 36, secured to a horizontal plate 37, fastened to the platform 1 by means of screws 38, and having distance therefrom at its inner side to provide a passage for a rack bar 39, the teeth of which mesh with the teeth of one series 33 of the gear 31 arranged thereabove. The rack bar 39 is suspended from the carriage P by means of extensions 39', formed integral with the bar 39 and extending at right angles thereto. The extensions 39' are secured by means of screws to the lower flanges of depending brackets 40, secured at the rear and front portion to the under side of the carriage P. The standard 36 is of greater height than the standard 35, and terminates at its upper end in a horizontal supporting plate 41, which has two apertures 42 and 43, elongated in transverse direction, and permitting passage of vertical stems 44 and 45 of two keys 46 and 47. The stem 45 extends with its lower end through an aperture in a horizontal arm 48, projecting from the standard 36 at a distance above the gear 31. The stem 45 is pivotally secured, as at 49, to a bell crank lever provided with pawls 50 and 50'. The bell crank lever is pivoted at 51 to a vertical bar 52, slidable in slots provided in the arm 48 and in another horizontal arm 53, projecting from the standard 36 above the arm 48.

As will be seen by reference to Fig. 1, the pawls 50 and 50' are adapted to separately engage the teeth of the series 32, 33 of the gear 31. A coiled spring 54 surrounds a portion of the stem 45, and abuts at one end against the arm 48, while its other end is secured to a pin 55 of the stem 45. The lower end of the stem 44 is articulated with one end of a lever 56, pivotally mounted in the standard 36, and engaging with its other end the vertical bar 52, the upward movement of which is limited by a spring 57, secured at one end to the arm 48 and at the other end to a pin 58, extending laterally from the bar 52. The downward movement of the bar 52 is limited by a stop 59, projecting from the plate 52 slightly above the arm 53. The stems 44 and 45 have reduced portions 44′, 45′, which fit in the elongated apertures 42, 43, provided in the upper supporting plate 41 to guide the stems 44 and 45 when the appertaining keys 46 and 47 are actuated.

Actuation of the key 47 causes a shifting of the paper carriage P equal to the distance between two notes on the staff, but this movement is arrested when half executed. In other words, in order to shift the carriage the required distance to permit the imprint of the next character, the actuation of the key 47 will cause the carriage to move the distance in two successive steps, so that an intermittent movement is obtained, as will be presently described. Upon actuation of the key 47 the bell crank lever is swung, so that the pawl 50 is released from engagement with the tooth series 32, with which it is ordinarily in mesh, and upon release of this engagement the winding motor 13, by exerting a pull on spring 9, moves the carriage P until in the continued movement of the bell crank lever, by virtue of the actuation of key 47, the pawl 50′ is brought into engagement with the tooth series 33, whereupon further movement of the carriage ceases. Upon release, the key 47 is raised to normal position by virtue of the action of spring 54, and this upward movement of the stem 45 causes a withdrawal of the pawl 50′ from engagement with the tooth series 33, and in this instance the motor 13 again exercises a pull on the spring 9 and consequently effects a further movement of the carriage until in the continued upward movement of the stem 45 the bell crank lever is further oscillated and the pawl 50 is brought into engagement with the succeeding tooth of the series 32, at which time the movement of the carriage is arrested. From the foregoing it is obvious that actuation and release of the key 47 afford two movements of the carriage P, each equal to half the distance between two consecutive characters on the staff; one-half of the distance being covered by the carriage upon the downward movement of the key 47 and the other half upon the release of the key 47.

The purpose of the key 46 is to release the carriage P from the controlling action of the gear 31 and bell crank lever 50, so that upon actuation of the key 46 the carriage P is free to execute its entire back movement under the action of the spring motor 13. As is obvious, pressing down of the key 46 causes oscillation of the lever 56, whereby the vertical bar 52 is raised, and thus both pawls 50 and 50′ are withdrawn from operative position with respect to the tooth series 32, 33 of the gear 31. The release of the gear 31 subjects the carriage to the action of the motor, which takes place until the key 46 is released, whereupon the spring 57 causes the return of the bar 52 and with it the return of the pawls 50, 50′ to operative position, such that the pawl 50 enters into engagement with the tooth series 32 and thus arrests further movement of the carriage P.

The frame for supporting the key carriage is formed by supporting plates 60, 61, slantingly arranged and secured at their lower ends to the platform 1 by means of screws and connected at their upper ends by horizontal cross rods 62 and 63, which are arranged in different horizontal planes. The rod 62 is located in front of and in a higher plane than the rod 63, and both constitute rails for pairs of wheels 64 and 65 respectively, which are rotatably secured to the key carriage T. The latter comprises a casing closed on all sides except at the front side, and is provided with a cover slantingly arranged, so that the front edge is in a lower horizontal plane than the rear edge.

The cover plate is provided with a number of keys (in the present instance fifty), which are arranged in rows of ten in transverse direction and in rows of five in longitudinal direction, the mechanism operated by said keys being arranged in a common vertical plane extending in transverse direction of the casing.

The side walls of the key carriage T are interconnected near the upper edge by five parallel, horizontally disposed shafts 66, 67, 68, 69, and 70, which serve as rock shafts for a corresponding number of bell crank levers 71, 72, 73, 74, and 75, pivotally secured at the forward end to the lower ends of five keys 76, 77, 78, 79, and 80, which are arranged in the same longitudinal row. The rear end of the bell crank lever is provided with a pin 81, by means of which the upper end of a metallic band, respectively designated by 82, 83, 84, 85, and 86, is secured, the opposite end of said band encompassing the lower rounded end of curved arms 87, 88, 89, 90, and 91, each comprising a pair of spaced plates rotatably mounted on horizontal parallel shafts 92, 93, 94, 95, and 96, secured to an inclined false bottom 97 of casing T by means of standards 98.

The curved arms are provided at the front side of the lower ends with flanges 99, interconnected by a pin 100, to which is secured the lower end of a spring 101, connected at its upper end to a wire loop 102, depending from the rock shafts 66 to 70, and having its ends secured to said shafts on each side of the appertaining bell crank lever. The five curved arms 87 to 91 of each longitudinal row are of different length, so that on operating their appertaining keys the upper ends of said arms will strike at the same place on the paper carriage, to which end the arms have a concentric curvature. In the upper end of the curved arms a rectangular block 103 is rotatably mounted by means of journals 103', said blocks having on two adjacent sides types 104, designating musical notes or characters which are the same on the same block and vary only in size.

The side walls of the casing T are interconnected above the highest curved arm 91 by a transverse bar 105, to which are secured, by means of screws 106, a plurality of angular plates 107, which contact with two adjacent sides of the bar 105 and continue in a depending vertical tongue or lip serving as a stop or abutment for the type blocks 103, so that in the same longitudinal row the type blocks 103, when in inoperative position, are in vertical alinement.

The arrangement and construction of the types 104, according to my new method, are so chosen that a reduced keyboard is afforded which permits me to meet all the requirements of musical composition. In Fig. 21 of the drawing, the blocks, arranged in longitudinal rows of five and transverse rows of ten, are shown in perspective with types on two adjacent faces, and the longitudinal rows are designated by the letters $a$, $b$, $c$, $d$, $e$, $f$, $g$, $h$, $l$, and $m$. The types of row $a$ are the ones for indicating the clefs, such as "sol," "fa," and "do" clef. Other characters may be printed, as, for instance, the time and the rests. The types of row $b$ represent numerals, such as 1, 2, 3, 4, 5, 6, 7, 8, and 9, to be properly combined for indicating the time. The rows $c$ and $d$ contain types indicating the lower notes; that is, the notes si and do below the muscal staff, as whole, quarter notes, and the like, with stems or without, and besides each row has a type indicating a leger line to change the name of the note. Row $e$ contains the types indicating flats, double flats, sharps, double sharps, and naturals. Row $f$ contains two types of a half note and two types of a quarter note, one type having an upwardly directed stem and the other type having a downwardly directed stem and both notes being of normal size. The types contain also the same notes in reduced size as required for printing grace notes. An additional type contains a bar in normal and reduced size. The row $g$ contains one type of a whole note in both sizes, another type of a quarter note in both sizes and without a stem, two types indicating stems and a type indicating a slur. The row $h$ contains the types indicating whole, half, quarter, eighth, sixteenth, and thirty-second rests, and also contains other types indicating signs used for indicating the intensity of the sound, such as, for instance, pianoforte, rallentando, and crescendo. Rows $l$ and $m$ contain the types indicating the notes of the high register; that is, notes "la" and "si" above the musical staff, shown as full and quarter notes, with and without stems; and each row contains the type indicating a leger line for changing the name of the note.

Above the keyboard T a mechanism is arranged for spacing the types with respect to the musical staff, such that the same type, resting at a different distance from the musical staff, constitutes a note of different name and consequently of different pitch. The mechanism comprises a horizontal frame $t$, supported by means of two brackets 108 on a horizontal bar 109, having on its rear face a scale with fractions indicated thereon. The bar 109 is secured to a vertical frame 110, rigidly fastened on the rear portion of the platform 1 by means of plates 111, secured to the platform by a plurality of screws. The frame $t$ is supported on the key carriage T and extends rearwardly therefrom into the space containing between said casing and a rear frame 110. The frame $t$ contains longitudinally extending rods 112, 113, on which two series of transversely extending arms 114, 115 are rotatably mounted, the free ends of said arms being directed toward the longitudinal center of the frame $t$, there being six arms 114 arranged on the bar 112 and five arms 115 on the right hand bar 113. The arms are controlled by helical springs 116, whereby their free ends have a tendency to point upwardly, said springs being coiled around the rods 112, 113 with one end fixed thereto, while the other end is bent over rods 117, 118, located between the rods 112, 113 and the respective sides of the frame. $t$.

The arms 114 and 115 are so arranged that the arm of one series registers with the space provided between the arms of the opposite series. The free ends of said arms extend through slots 119 in a vertical plate 120, dividing the frame $t$ in halves and having end flanges 121, bent at right angles thereto, which are secured by screws to the front and rear parts of frame $t$. The plate 120 serves as an indicator or gage when the operator places the key carriage in operative position. The arms 114, 115 are provided at the free ends with downwardly directed projections 122, equipped with a V slot 123, by means of which the arms terminate in forks, the projections 122 being of the same width and arranged in longitudinal registry beneath the bar 120. Each of said arms 114, 115 is provided near the free end with a key constituting an integral part of said arm, and the six keys 124 of one series of arms are arranged in longitudinal registry similar to the five keys 125, which also register in longitudinal direction. The six keys 124 on the left side of the machine correspond to the notes to be found in the spaces of the musical staff or treble; that is, "fa", "la", "do", "mi", and also to two notes located directly below and above said musical staff; to-wit: "re" and "sol". The five keys on the right side of the frame $t$ correspond to the notes on the lines of the musical staff; to-wit: "mi", "sol", "si", "re", "fa".

In order to shift the carriage T of the general keyboard to a limited extent from right to left, in accordance with the vertical distance between a type printed and a type to be printed, two longitudinal horizontal plates 126 and 127 are arranged on the carriage T; the former of which is mounted from the carriage T by means of brackets 128, whereas the second plate 127 is directly mounted on the key carriage T and provided with downwardly extending end portions secured to the sides of the casing T. On said longitudinal plates 126 and 127, arranged in the same horizontal plane but spaced from one another (Fig. 3), there are secured a plurality of parallel diagonal bars 129, spaced uniformly apart and having the upper edge 130 shaped in the form of a wedge. These wedge-shaped bars 129 correspond with the number of longitudinal rows of keys on the casing T. Inasmuch as slots 123 of the depending extensions 122 of arms 114, 115 are of the same width and in view of the slight inclination of the diagonal bars 129, all slots 123 can engage a selected bar 129 but with varying effect, so that according to the key pressed down the bar 129 and therewith the carriage T are shifted in transverse direction to a greater or lesser extent. The frame $t$ is movable on the supporting bar 109, and may be secured in desired position thereon by means of a bracket 131 (Figs. 10 and 11), which encompasses the upper portion of bar 109 and carries at its free end a screw 132 entering one of the openings 133 provided in the rear side of the bar 109, equipped with a graduated scale.

The bracket 131 is provided on its front and rear parts with apertures 134, in which is journaled a shaft 135, arranged above the frame $t$ and which has keyed thereto a pinion 136, meshing with a rack bar 137, secured to the rear part of the frame $t$. The shaft 135 passes through slots 138, formed in guide plates 139 and 140, extending vertically and secured to the front and rear parts of the frame $t$. The shaft 135 is extended at the front side to form a handle 141, by means of which the frame $t$ can be moved from right to left, or vice versa, after the bracket 131 is secured to the bar 109 by means of the set-screw 132. Upon actuation of the handle 141 the shaft 135 is forced to rotate, so that the pinion 136, meshing with the rack 137, moves the latter. The length of the rack corresponds to the distance from the bass register to the high register on the musical staff.

Figure 17:
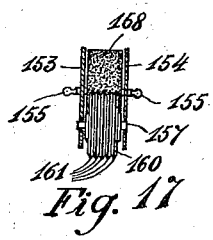
Fig. 17 is a vertical cross-section thereof.
Figure 15:
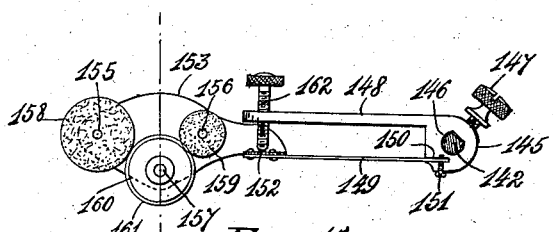
Fig. 15 is a longitudinal section of the device for tracing the musical staff on the paper.
Figure 16:
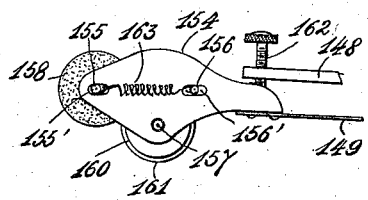
Fig. 16 is a side view of said device.

The musical staff is drawn on the paper carriage P by means of a device radially mounted on a horizontal bar 142, placed above said carriage P, and supported by standards 143, 144, secured to the platform 1. The rod 142 has a scale on which fractions of an inch are indicated, the divisions corresponding with the divisions indicated on the scale of bar 109. The device shown in Figs. 15, 16 and 17 consists of a member 145 of substantially cylindrical form, equipped with an irregularly shaped aperture 146, through which the rod 142 extends, and secured in adjusted position by means of a set-screw 147. The member 145 is formed with a horizontal extension originating at the top of the member 145 and forming the arm 148. A spring 149 enters a recess 150, provided in the member 145, and is secured therein by a screw 151. The free end of said spring 149 is secured to two horizontal flanges 152, projecting from vertical plates 153 and 154, arranged parallel and serving as a support for three rotary shafts 155, 156, and 157; two of which, 155 and 156, are arranged in the same horizontal plane but spaced from one another, and respectively carry felt rollers 158, 159, serving as an inking roller and a cleaning roller.

The third shaft 157 is arranged intermediate said first named shafts but in a lower horizontal plane, and carries a roller 160, equipped with five circumferential edges 161, which are adapted to trace the five lines of the musical staff $n$. The felt rollers 158, 159 are in tangential relation with respect to the printing roller 160, so that engagement with the felt rollers and the printing rollers takes place at desired points. At the end of the horizontal arm 148 a set-screw 162 engages the adjacent end of the spring 149, by means of which the latter, carrying the aforementioned rollers, can be raised or lowered in order to adjust the position of the printing roller 160 on the paper on which the musical staff $n$ is to be traced. To maintain the rollers 158 and 159 in engagement with the printing roller 160 the shafts 155 and 156 are provided in elongated apertures 155' and 156' in the vertical plates 153 and 154, and the two ends of the shafts are interconnected by springs 163.

The type blocks 103, carrying the types 104 of the keys 76, 77, 78, 79, and 80 of the same longitudinal row on the general keyboard, strike the carriage P on the same point where the ink ribbon 164 passes, which is mounted, as in the ordinary typewriting machine, on two reels 165 and 166, the former of which is mounted on the left side of rails 5 and 6 of paper carriage P and in the rear of the gear 31, which forms a part of the mechanism for longitudinally shifting the carriage P. A horizontal shaft 165', which carries a reel 165, is supported in a vertical plate 167, secured to the horizontal plate 37 by means of screws. The plate 167 is formed with an extension 168, extending rearwardly from the plate 167 and serving as a support or guide for the ribbon 164 when the latter is wound upon the reel 165. The reel 166 is mounted on the right hand side of rails 5 and 6 of carriage P on standards 169, formed with a horizontal plate 170, which also serves as a support or a guide for the ink ribbon 164 when being unwound from the reel 166. Similarly as in ordinary typewriting machines, each reel is provided with a ratchet wheel mechanism and detent, so that the ribbon is continuously moved in the same direction, which in this case will be from reel 166 to reel 165; the reel 165 being driven from shaft 34 of the gear 31 by means of bevel pinions 171 and 172, fixed on the ends of shafts 34 and 165', and meshing with each other, so that upon rotation of gear 31 the ribbon advances a predetermined length.

A device is arranged for centering and guiding the type blocks 103 when striking on the paper carrier P, and for actuating the type block whenever it may be necessary to substitute for the type of ordinary size the type of smaller size, such as for printing graces. This guiding device comprises a member 173, substantially of cylindrical shape and slidably mounted on the bar 142, which extends through a cylindrical aperture 173' of said body, said aperture permitting rotation of the body 173 on the bar 142. The member 173 is fixed in adjusted position on the bar 142 by means of a set-screw 174, and a horizontal arm 175 extends from said member and is formed integral therewith. To the lower side of the arm 175 a Z plate 176 is secured by means of a screw 177, having a knurled head, said plate terminating in a horizontal member 178, provided with two outwardly curved vertical flanges 179, one on each side; said member serving as a supporting guide for the ribbon 164 and assisting a striking type 104 to come into contact with the ribbon and paper carriage at a certain desired point, which is the center of the horizontal member 178.

The arm 175 carries, by means of a bracket 180 secured thereto by a set-screw 181, an adjustable horizontal plate 182, provided with a bearing member 183, on which is rotatably mounted the disk 184, a quarter of which is cut off so as to provide a right-angled cut-out 185. The journal 183 also carries an inclined lever 186, arranged adjustably with respect to the disk 184 by means of an arcuate slot 187, provided in said disk, through which passes a screw on the lever 186. The latter is provided with a counterweight 188, adjustably arranged thereon by a set-screw 189, entering one of a series of openings 190, provided in the lever 186. The disk 184 forms the actuating member for the types. To place the plate 182 in inoperative position, it is shifted rearwardly after the set-screw 181 has been loosened.

Figure 19:
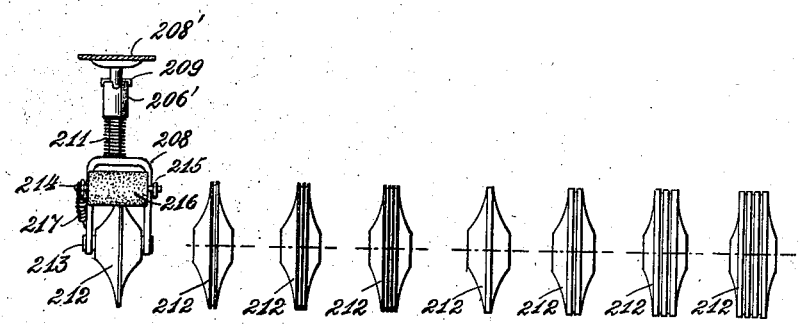
Fig. 19 is a front view of the rollers employed in the mechanism shown in Fig. 18.

The mechanism for tracing the flags of quarter, eighth, sixteenth notes, etc., is separate from the general keyboard of the carriage T, and comprises a segment 191, provided with a central apertured extension through which passes a pinion 192, serving as a pivot for said segment and passing through the prongs of a fork 193, forming the terminal portion of a bar 194, which has a curved portion 195 intermediate its ends, and is pivotally secured by means of a pin 196, parallel to pin 192, to a short bar 197, rotatably secured by means of a pin 198, perpendicular with respect to pins 196, to the radial arm 199 of a collar 200, fast to a horizontal rod 201, carried by the vertical members of the frame 110. The bar 201 is vertically adjustable in vertical slots 202 in the sides of the frame 110, through which the threaded ends of the bar 201 extend, and nuts 203 secure the bar in adjusted position. In this manner the bar 194 has two movements; one in perpendicular direction together with the vertical adjustment of the rod 201, and then a swinging movement about the rod 201 as pivot. The segment 191 is provided at its edge with a wall, which is of course of semi-cylindrical shape, and in this wall 204 a plurality of vertical slots 205 are provided, through which pass in radial direction arms 206, pivotally secured with inner forked ends on journals laterally projecting from supporting posts 207 arranged in arcuate form on the segment 191, said arms 206 having on the outer ends a vertical sleeve 206' rigidly secured to each arm, a fork 208 being rotarily mounted in each sleeve 206' and each fork having an upper head 208' provided with a cross-pin 209, to limit the movement of the shank of fork 208. On the shank of the fork a helical spring 211 is arranged, which is held between the arm 206 and the fork proper; the latter carrying a printing roller 212, which is journaled with its shaft 213 in the prongs of the fork 208. An upper shaft 214 is supported in a frame 215, swingingly mounted to the prongs of the fork 208. The frame 215 rotatably receives an inking roller 216, which is adapted to contact with the periphery of the printing roller 212 by virtue of the action of a coiled spring 217, connecting one end of the shaft 214 to one prong of the fork 208. The arm 206 is maintained in raised position by means of a spring 219, connecting a point 220 of each arm to a point 221 of the semi-cylindrical wall 204. Eight printing rollers 212 are provided; four of which, arranged at the right hand side, as viewed in Fig. 19, are respectively provided with one, two, three, and four circumferential edges for tracing the flags of the half, quarter, eighth notes, etc., of the ordinary size, and the remaining four rollers on the left side, as viewed in Fig. 19, also have respectively one, two, three, and four circumferential edges for tracing the flags of the grace notes which are printed in reduced size.

The mechanism for tracing the ties consists of a vertical shaft 222, secured by a set-screw 223 in a vertical sleeve 224, forming part of an angular supporting arm 225, equipped with an integral, horizontally extending sleeve 226. A horizontal shaft 227 passes through said sleeve 226, and is held therein in adjusted position by set-screw 228, which, however, permits the rotation of said shaft. The shaft 227 terminates at its outer end in a knurled disk 229 and at its inner end in a bevel pinion 230, meshing with a similar bevel pinion 231 loosely mounted on the lower end of the shaft 222, and rigidly secured to the top of a vertical frame 232, placed in eccentric relation with respect to the shaft 222, is arranged, and in the vertical members of this frame two shafts 233 and 234 are arranged in superposed relation; the upper one 233 extending through vertically elongated apertures 235 to be adjusted with respect to the relatively stationary shaft 234, to which end helical springs 236 are provided, which interconnect the ends of shaft 233 and screws 233', arranged on the vertical members of the frame 232.

The lower shaft 234 carries a printing disk 237, the hub of which is slidably mounted on the shaft 234, and may be locked in adjusted position by set-screw 238. The upper shaft 233 loosely carries an inking felt roller 239, provided with a circumferential groove 240, into which the edge of the printing disk 237 projects, so that upon shifting of disk 237 the roller 239 is shifted to the same extent on its shaft 233, whereby the disk and the roller are always in vertical alinement. Due to this arrangement, it may readily be seen that the eccentric relation of disk and roller with respect to the shaft 222 may be changed at will, to be increased or decreased, as the case may be. This mechanism is secured in position over the paper carrier P by means of a support in the form of a block 241, slidably mounted on a horizontal bar 242, which has at its end eyes for the passage of vertical posts 243, projecting downwardly from the horizontal bar 62, forming the rail on which the wheels 64 of the carriage T are running, the block 241 being adjusted in position by means of a set-screw 244. On a journal 245, projecting downwardly from said block, there is rotatably mounted a horizontal bar 246, having a vertical, downwardly extending sleeve 247, through which passes the vertical shaft 222. The shaft is secured within the sleeve 247 by a set-screw 248, and a coiled spring 249 is arranged between the lower sleeve 224 and a collar 250 adjacent to the upper sleeve 247.

The operation of the machine is as follows:

The paper carrier P is pulled forwardly by pressing down with one hand the key 46 and grasping with the other the handle 19, whereupon the key 46 is released and thereby the carriage P locked in forward position. Thereupon the paper which is to receive the imprint of the keys is placed on the platform $p$ of the carriage P, the paper being held in printing position on the carriage P by means of the described mechanism. To trace the musical staff the member 145 is shifted along the bar 142 until it registers with the desired graduation on the scale bar 142 which indicates the printing zone. The shifting is effected by loosening the set-screw 147 prior to shifting and tightening of the same after the desired position of the member 145 is reached. Thereupon the pressure of the printing roller 160 is regulated in accordance with the number of copies to be made and the quality of the paper to be used, to which end the original sheet of paper is arranged with a number of carbon papers and second sheets in the same manner as it is done with ordinary typewriting machines. The pressure of the printing roller 160 is regulated by tightening or loosening, as the case may be, the set-screw 162, which contacts with the spring 149, which latter carries the plates 153 and 154, equipped with the inking, printing, and cleaning rollers. The paper carrier P is then released by pressing down the key 46, so that under the action of the spring motor 13 it will be moved longitudinally on the rails 5 and 6 to complete its entire rearward stroke, whereby simultaneously the staff is printed on the whole length of the paper by the circumferential edges 161 of the printing roller 160. The carriage P is then drawn forwardly again to its starting position by pulling the handle 19 and pressing down key 46, which is subsequently released when the carriage is in starting position ready to receive the imprint of the notes and other musical characters.

To print the musical characters or notes, it is first necessary to arrange the frame $t$ in proper relation with respect to the staff traced on the paper; that is, to the roller 160, with which the staff has been traced. To this end the set-screw 132, securing the bracket 131 to the scale bar 109, is loosened and the frame $t$ is shifted on said bar 109 toward the right hand side until the set-screw 132 is opposite that division on the bar 109 which corresponds to the division on the scale bar 142 to which the staff tracing disk 160 has been set. Thereupon the set-screw 132 is threaded into the appertaining hole 133 of the bar 109. Having set the frame $t$, the roller 160 is removed by shifting member 145 to the end position at the right hand side of the machine, and in its place the guiding means 179 (Fig. 7) for the type blocks 103 is arranged. This is effected by shifting the member 173 on the scale bar 142 after the set-screw 174 has been loosened, which of course is tightened again when the member 173 is in the desired position. In this position the frame 178 serves as a support for the ribbon 164. Upon loosening the set-screw 181, the plate 182, carrying the type actuating disk 184, is shifted rearwardly and subsequently the set-screw 181 is tightened.

In order to print on the staff $n$ the desired clef, the first longitudinal row $a$ of the keyboard is placed in the proper position with respect to the frame $t$, so that upon actuation of the keys 76 to 80 of said row the type blocks 103 are actuated, which contain the characters indicating the various clefs. To this end the carriage T, containing the keyboard, is moved to the right until the front end of the diagonally extending wedge-shaped bar 129 thereof, adjacent to said row of keys $a$, registers with the bar 120 of the frame $t$. Thereupon the key 124 or 125 of the frame $t$ which is marked with the desired clef is pressed down. The actuation of keys 124 or 125 causes the depending extension of the arms 114, 115 to engage with its V-shaped groove 123 any one of the wedge-shaped bars 129 of carriage T which has been placed in registry with bar 120, so that the carriage is properly adjusted and the note is printed in the desired space or line of the staff. Immediately thereafter the key of carriage T actuating the type containing said clef is also pressed downwardly. For instance, if it is desired to print the "sol" clef, the key marked "sol" of frame $t$ is pressed down, and immediately thereafter the key 78 of the row $a$ of keyboard T which actuates the block 103 carrying the type 104 representing the "sol" clef is pressed down.

In the further use of the machine the spacing key 47, which advances the carriage P one space, is pressed down and the desired number is printed, to which effect the row $b$, the blocks 103 of which carry the number types, is placed in proper position with respect to the frame $t$ by moving the carriage T to the left until the front end of the wedge-shaped bar 129 appertaining to the row $b$ comes into registry with the bar 120 of frame $t$, in which case only the keys of the carriage T are pressed down, as the numbers to be placed immediately after the clef of course are printed right on the staff and do not have to be adjusted with respect to the lines or spaces of the staff, as is the case where notes of different pitch value are to be printed. It is of course necessary that between the actuations of two keys of the carriage T the spacing key 47 must be pressed down in order to provide the necessary space between consecutive numbers or characters in the musical staff $n$.

If the note is in the middle register, row $f$ or $g$ of the keyboard T is placed in proper relation with respect to the frame $t$, whereupon first one of the keys 124 or 125 of the frame $t$ is pressed down which corresponds to the note to be printed, and thereby the frame and with it the respective row is placed in proper position with respect to the musical staff, so that the printed note is in that position in which it has the desired pitch value. If the note is in the high register or in the base register, the rows $c$ or $d$ of the base register or the rows $l$ or $m$ of the high register of the keyboard T are arranged with respect to the frame $t$, and once the desired row is adjusted, the handle 141 is turned to the left if the note corresponds to the high register, and then the key 124 or 125 of the frame $t$ is pressed down and immediately thereafter the key of the row on the keyboard T carrying the types "do" or "si" for the base register or the types "la" or "si" for the high register is actuated. Finally the key of the same group of the general keyboard T carrying the type indicating the leger line is actuated. Thus, for instance, for printing the note "la" of the base register the key marked "la" of the frame $t$ is pressed down, and thereafter the key actuating the type "do" of the keyboard T is actuated and then the key of the board T indicating a leger line is actuated. Without resorting to types "do" and "la" of rows $d$ and $l$ of the bass and high registers respectively, the rows $c$ and $m$, comprising the types "si" bass and "si" high, can be adjusted to proper position, and thereupon types are actuated indicating leger lines, so that notes of different pitch values may be printed.

For printing chords on the staff the movement of the paper carrier P is arrested and only such types are actuated which contain notes without stems, as manifestly the printing of all the stems of the different notes would make a blurring line. It suffices that the lowermost and uppermost notes are provided with an upwardly and downwardly directed stem respectively.

The slur or crotchet types contained in row *g* are used only when shakes containing simple, double, triple, and quadruple notes are to be separately printed, in which case the said row *g* is adjusted with respect to the frame *t*, and the key 124 or 125, showing the same name of the note previously printed with the stem, is pressed down and immediately thereafter the key of the group *g* containing the slur or crochet type is actuated.

For printing the grace notes, the small clefs, and the numbers that are arranged on the second face of each type block 103, a shifting device is used, comprising a "Z" disk 184, which is moved forward after the set-screw 181 is loosened, and the plate 182 is shifted until the disk 194 is arranged within the path of the blocks 103, in which position the plate 182 is secured by tightening set-screw 181. With the arrangement of the parts as mentioned, the side of the block containing the large size type will come into contact with the right-angled cutout 185 of the disk 184, whereby the disk 184, together with its arm 186 and its counterweight 188, is rotated to occupy the position indicated in dotted lines in Fig. 7, so that the block fits within the edges of the cut-out 185, and this contact imparts a quarter revolution to the block about its journals 103', so that the side of the block containing the small size type will contact with a ribbon 164, carried by the frame 178, and when the block 103, after having made an impression, is drawn upwardly by the action of the spring 101, it again enters into contact with the disk 184, so that it is turned in opposite direction to the one carried out in the downward stroke to maintain the large size type in normal position. When the required number of small size notes has been printed in the manner described, the disk 184 is withdrawn from operative position, whereupon notes of ordinary size may again be printed.

Figure 18:
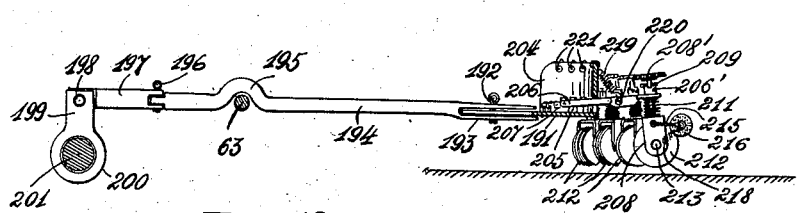
Fig. 18 is a side elevation of an auxiliary mechanism for tracing the flags so as to indicate full, half, quarter, eighth notes, etc.
Figure 20:
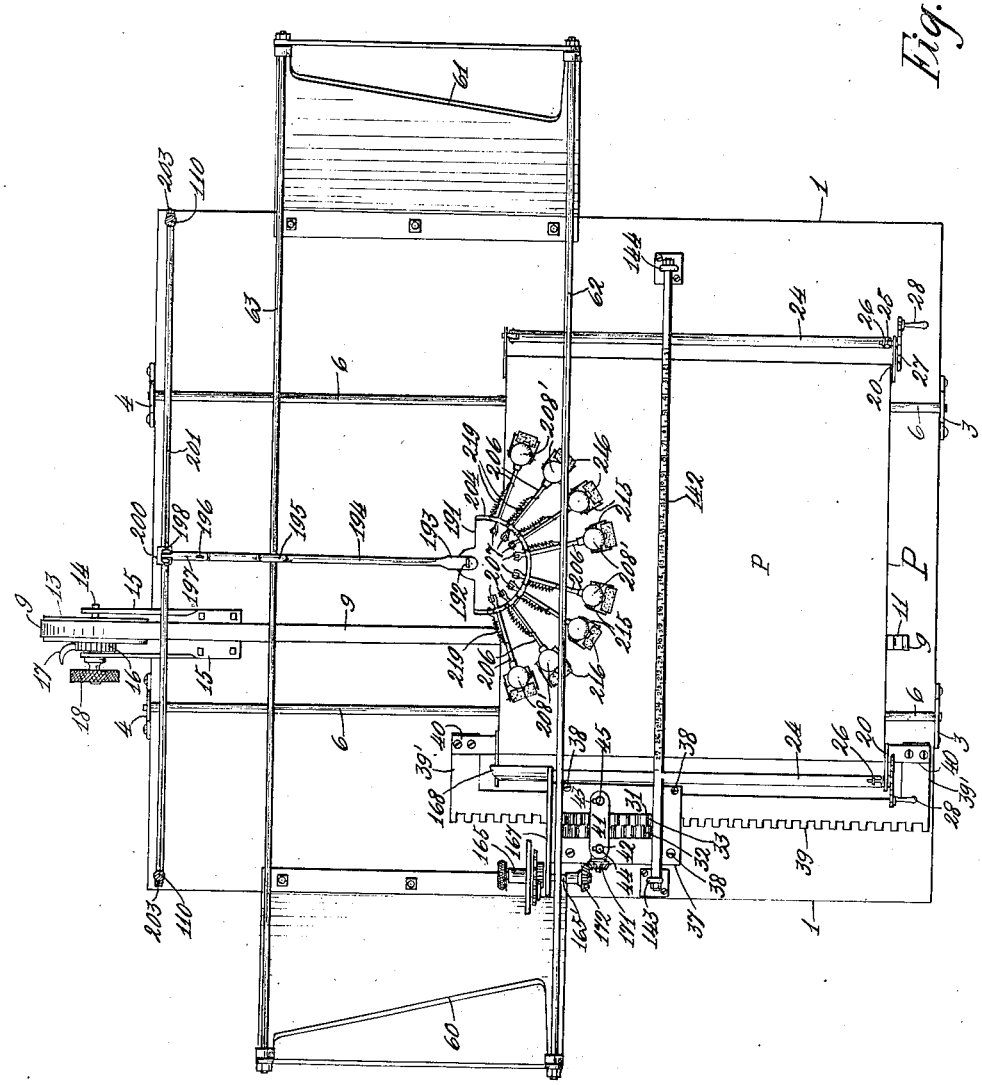
Fig. 20 is a top plan view of the machine with the keyboard omitted.

To trace the flags of the grace notes, the device shown in Figs. 18, 19, and 20 is employed, which device is used after all the notes and musical characters on the musical staff have been printed. To this end the carriage P is shifted to one side and the bar 194, carrying the segment 191, is rotated about the supporting rod 201. The printing rollers 212 are placed on the musical staff *n* traced on the paper, advantage being taken of the double movement which the bar 201 has by its support. Thereupon the notes already printed are provided with flags, to which end that roller 212 is arranged in proper position which has the corresponding number of the said circumferential threads or edges to the note to be printed.

To provide the flags of grace notes of different values, as, for instance, a chord containing two eighths and two sixteenth notes, first a single line is marked throughout the extension of the chord, and subsequently the double line is indicated in the restricted space given by the remaining notes of less time value.

To draw ties the device shown in Figs. 13 and 14 is used, to which end also the carriage T is placed outside of the printing zone and the supporting block 241 is shifted on the supporting bar 242 by loosening the set-screw 244 and tightening it again when the member 241 registers with the desired position on a musical staff, care being taken that the disk 237 is set on the place where the tie is to start. Thereupon the knurled disk 229 of the shaft 227 is turned, causing the rotation of the vertical shaft 222 and of the vertical frame 232, carrying the disk 237, which will describe a semi-circle on the paper. To change the size of the tie the tracing disk 237 is adjusted with respect to the shaft 222 by loosening the set-screw 238 and removing the disk 237 on its shaft, on which the set-screw 238 is tightened.

I claim:

1. In a machine for printing musical characters, a platform, a type carriage movable in transverse direction, a paper carriage movable in longitudinal direction, a graduated guide extending transversely with respect to the paper carriage, staff drawing means slidable on said guide, means for spacing the paper carrier in longitudinal direction, and means for setting the type carriage with relation to the paper carriage, said means including a graduated guide parallel to the first named guide, the divisions of both guides being equal and in registry with one another.

2. In a machine for printing musical characters, the combination with a platform, of a type carriage movable in transverse direction, keys and types arranged in transverse and longitudinal series thereon, a paper carriage movable in longitudinal direction, a graduated bar extending transversely with respect to said paper carriage, staff tracing means slidable on said bar, spacing means for the paper carrier, means for setting the types with respect to the printing zone of the paper carriage, means for subsequently adjusting the keys and types of each longitudinal series with respect to the printing zone, and a second graduated bar parallel to the bar of the staff drawing means and slidably carrying said setting and adjusting means, the divisions of both graduated bars being in registry with and equal to one another.

3. In a machine for writing musical characters, in combination with a platform, a type carriage movable in transverse direction, keys arranged in transverse and longitudinal series thereon, arms connected with said keys, double face type blocks journaled in said arms, means for imparting a slight turn to each block prior to reaching the printing position, a paper carriage movable in longitudinal direction, a graduated bar extending transversely with respect to the paper carriage, staff drawing means adjustable on said graduated bar, spacing means for the paper carriage, means for setting the type blocks with respect to the printing zone of the paper carriage, means for subsequently adjusting the types of each longitudinal series with respect to the printing zone, and a second graduated bar parallel to the first named bar and slidably carrying said setting and adjusting means, the divisions of both graduated bars corresponding and registering with each other.

4. In a machine for writing musical characters, in combination with a platform, a type carriage movable in transverse direction, keys arranged in transverse and longitudinal series thereon, arms connected with said keys, double face type blocks journaled in the upper ends of said arms, means separate from said carriage for imparting a slight turn to each block prior to reaching the printing position, a paper carriage movable in longitudinal direction, a graduated bar extending transversely with respect to the paper carriage, staff drawing means adjustable on said graduated bar, spacing means for the paper carriage, means for setting the type blocks with respect to the printing zone of the paper carriage, means for adjusting the types of each longitudinal series with respect to the printing zone, and a second graduated bar parallel to the first named bar and slidably carrying said setting and adjusting means, the divisions of both bars being equal to and in registry with one another.

5. In a machine for writing musical characters, in combination with a platform, a paper carriage movable thereon, a key carriage movable in direction perpendicular to the direction of movement of said paper carriage, keys arranged on said key carriage to form transverse and longitudinal series, means for setting the longitudinal series in proper relation with respect to the printing zone on the paper carriage, said means comprising a graduated bar, a frame supporting said graduated bar, a movable frame carried by said bar, a plurality of longitudinal series of keys arranged on said movable frame, a plurality of spaced longitudinal shafts, arms connecting said keys with said shafts, springs surrounding said shafts and maintaining the keys in elevated position, said arms having downwardly extending lugs provided with V-shaped grooves of varying width, a plurality of diagonal bars having a beveled upper edge arranged on said key carriage and adapted to be received within the V-shaped grooves of said arms, and an indicator bar arranged between the series of keys of the movable frame with respect to which the longitudinal series of said key carriage are adjusted.

6. In a machine for writing musical characters, in combination with a platform, a paper carriage movable thereon in longitudinal direction, a key carriage movable in transverse direction, a frame mounted on said platform, a graduated bar supported by said frame, an auxiliary key carriage movable on said bar and adapted to be set in accordance with the graduations of said bar, means provided on said auxiliary carriage to facilitate setting of said key carriage with respect to the printing zone, and means on said auxiliary carriage for effecting slight adjustments of said key carriage to vary the printing position of the character on the staff, substantially as described.

7. In a machine for writing musical characters and the like, in combination with a platform, a paper carriage movable thereon, a key carriage movable in a direction perpendicular to the direction of movement of said paper carriage, a plurality of transversely extending rods mounted within said key carriage, concentrically curved arms mounted on said rods, type blocks arranged to form transverse and longitudinal series carried by said arms, keys projecting above said carriage, bell crank levers connected with the keys, means connecting the ends of the bell crank levers to the lower end of said curved arms, and coiled springs connecting the pivot of each bell crank lever with its appertaining arm above the pivot thereof.

8. In a machine for writing musical characters and the like, in combination with a frame, a paper carriage movable thereon, a key carriage movable in direction perpendicular to the movement of said paper carriage, keys and types arranged on said key carriage in transverse and longitudinal series, means for placing the longitudinal series of said keys and types in proper relation with respect to the printing zone on the paper carriage, said means comprising a fixed frame, a graduated bar supported by said frame, a movable frame slidable on said graduated bar, a bracket to secure the movable frame in adjusted position, a shaft projecting through said bracket in longitudinal direction, a bevel pinion on said shaft, and a rack secured to the movable frame and meshing with said pinion, said shaft being provided with a handle for rotation, the extension of said rack being sufficient to shift said movable frame a distance corresponding to the distance between the bass and high registers on the musical staff.

9. In a machine for writing musical characters and the like, a platform, a paper carriage movable thereon, means for gripping the paper at opposite edges to hold it on the paper carriage, said means comprising a shaft arranged on each side of the carriage, supports for said shaft, a semi-cylindrical casing secured to the shaft, a complementary casing hingedly connected at one end to said first named casing, locking means for securing the free end of the movable casing to said shaft, a ratchet wheel on one end of said shaft and having a handle to facilitate rotation thereof, and a detent pivotally secured on the carriage for maintaining the shaft in paper gripping position.

10. In a machine for writing musical characters and the like, a platform, a paper carriage movable on said platform, means for spacing and releasing said paper carriage, said means comprising a frame arranged laterally of said carriage, a gear carried by said frame and having two series of teeth, the teeth of one series being circumferentially offset with respect to the teeth of said other series, a rack bar arranged underneath said gear and meshing therewith, a double pawl lever, a bar slidable in vertical direction and pivotally secured to said lever, a guide frame for said bar, means for holding one of the pawls of said lever in engagement with the teeth of one of the series of said gear, means for actuating said double pawl lever, a spring opposing said actuation, means operated by another key for separating said pawl lever from the gear, and a spring opposing such movement, the first key permitting spacing of the paper carriage and the second key permitting entire release and complete back movement of the carriage.

11. In a machine for writing musical characters and the like, a platform, a paper carriage movable on said platform, means for spacing and releasing said paper carriage, said means including a gear, a frame laterally of said carriage in which said gear is journaled, said gear having two series of teeth, the teeth of one series being circumferentially offset with respect to the teeth of said other series, a horizontal rack bar secured to said carriage and meshing with said gear, a double pawl lever adapted to mesh with said gear, a frame, a rod vertically slidable in said frame and articulated with said double pawl lever, a spring for maintaining said rod in elevated position, whereby one of said pawls is in engagement with said gear, an arm secured to the pivot of said double pawl lever, a lever secured at one end to said arm, means for actuating said lever whereby said pawl lever is lifted clear of said gear, a spring opposing such action, a shaft, a reel on said shaft, and gear means connecting the shaft of said gear with the shaft of said reel to move the ribbon.

12. In a machine for printing musical characters and the like, a platform, a type carriage movable in transverse direction, a paper carriage movable in longitudinal direction, and means for drawing the staff on the paper carriage, said means comprising a graduated bar supported above said paper carriage, a member slidable on said bar, vertical brackets, flexible means for securing said brackets to said member, a printing roller having five circumferential threads journaled in said brackets, an inking roller journaled in said brackets in tangential relation to said first named roller, and means provided on said member for regulating the pressure of said printing roller.

13. In a machine for printing musical characters and the like, a platform, a type carriage movable in transverse direction, a paper carriage movable in longitudinal direction, and means for drawing the staff on the paper carriage, said means comprising a graduated bar supported above said paper carriage, a member slidable on said bar, vertical brackets, a spring securing said brackets to said member, a printing roller having five threads journaled in said brackets, an inking roller also journaled in said brackets in tangential relation to said printing roller, and a set-screw in an extension of said member and engaging said spring to adjust the pressure of said rollers.

14. In a machine for writing musical characters and the like, a key carriage, rotatably mounted arms in said carriage, double face type blocks rotatably carried by said arms, and means for turning said blocks prior to reaching the printing position, said means comprising a guide parallel to said carriage, a supporting element adjustable on said bar, a disk rotatably mounted at the end of said element and having a right-angled cut-out normally at the upper part, said disk being adapted to receive said block in its cut-out to impart to the latter a quarter turn upon being forced to rotate in the downward and upward strokes of said type block.

15. In a machine for writing musical characters and the like, a platform, a paper carriage movable thereon, means for drawing the flags of notes, comprising a frame, a member rotatably and slidably mounted on said frame, said member terminating in a segment, a plurality of yieldingly mounted radial arms in said segment, and printing rollers having respectively one, two, three, and four threads carried by said arms, said segment being adapted to be placed on the paper carriage to draw the flags upon movement of said carriage.

16. In a machine for writing musical characters and the like, a platform, a paper carriage movable on said platform, a fixed frame transversely disposed above said carriage, a support adjustable on said frame, an arm rotatably secured to said support, a vertical shaft adjustably supported by said arm, a frame loosely mounted on the lower end of said vertical shaft and arranged eccentrically with respect thereto, a pair of horizontal shafts mounted in said eccentric frame, a tracing disk adjustably mounted on the lower one of said shafts, an inking roller provided on the upper of said shafts, said tracing disk extending into a circumferential groove provided on the periphery of said inking roller, and manually operated means for imparting rotation to said frame on said vertical shaft.

17. In a machine for writing musical characters and the like, a platform, a paper carriage movable on said platform, a fixed frame transversely disposed above said carriage, a support adjustable on said frame, an arm rotatably secured to said support, a vertical shaft adjustably supported by said arm, a frame loosely mounted on the lower end of said vertical shaft and arranged eccentrically with respect thereto, a pair of horizontal shafts mounted in said eccentric frame, a tracing disk adjustably mounted on the lower one of said shafts, an inking roller provided on the upper of said shafts, said tracing disk extending into a circumferential groove provided on the periphery of said inking roller, manually operated means for imparting rotation to said frame on said vertical shaft, and means for varying the eccentricity of said tracing disk with respect to said vertical shaft.

In testimony whereof I have signed my name to this specification in the presence of two subscribing witnesses.

JOSÉ SANAHUJA RIVERA.

Witnesses:
 CARLOS NOGUERA,
 RICARDO MORÉ.